(12) United States Patent
Anderson et al.

(10) Patent No.: US 6,856,423 B2
(45) Date of Patent: Feb. 15, 2005

(54) DUAL SCANNER SYSTEM AND METHOD

(75) Inventors: Bradley J. Anderson, Boise, ID (US); William I. Herrmann, Eagle, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 406 days.

(21) Appl. No.: 09/938,981

(22) Filed: Aug. 24, 2001

(65) Prior Publication Data

US 2003/0038988 A1 Feb. 27, 2003

(51) Int. Cl.$^7$ .............................................. G06K 15/00
(52) U.S. Cl. ...................... 358/1.18; 358/1.3; 358/1.12; 358/1.16; 358/462; 382/312
(58) Field of Search ................. 358/526, 530, 358/403, 406, 462, 448, 474, 505, 506, 513, 514, 482, 483, 486, 443, 496, 497, 498; 382/312, 314, 315, 318, 319, 321

(56) References Cited

U.S. PATENT DOCUMENTS

| | | | |
|---|---|---|---|
| 4,672,186 A | 6/1987 | Van Tyne | 235/420 |
| 5,262,624 A * | 11/1993 | Koch | 235/456 |
| 5,298,937 A * | 3/1994 | Telle | 355/23 |
| 5,547,179 A | 8/1996 | Wilcox et al. | 271/3.2 |
| 5,568,281 A | 10/1996 | Kochis et al. | 358/475 |
| 5,592,576 A | 1/1997 | Hayashi | 382/312 |
| 5,727,890 A | 3/1998 | Stodder et al. | 400/624 |
| 5,865,121 A | 2/1999 | Testardi et al. | 101/483 |
| 5,896,206 A | 4/1999 | Kellogg | 358/498 |
| 5,912,982 A * | 6/1999 | Munro et al. | 382/135 |
| 6,678,076 B1 * | 1/2004 | Hasegawa et al. | 358/496 |
| 2002/0145035 A1 * | 10/2002 | Jones | 235/379 |

\* cited by examiner

*Primary Examiner*—Jerome Grant, II (57) ABSTRACT

A system and method for scanning a medium and reproducing an image of the medium includes a first scanner adapted to scan a first side of the medium and a second scanner adapted to scan a second side of the medium. As such, the first scanner detects one of a presence and an absence of a first image on the first side of the medium and the second scanner detects one of a presence and an absence of a second image on the second side of the medium.

14 Claims, 9 Drawing Sheets

DUAL SCANNER SYSTEM AND METHOD

THE FIELD OF THE INVENTION

The present invention relates generally to image scanning systems, and more particularly to a system and method for scanning and reproducing an image of a medium using dual scanners.

BACKGROUND OF THE INVENTION

A conventional scanning system used for scanning a medium and reproducing an image of the medium typically includes a light source and a sensor array, such as a charge coupled device (CCD), which includes light receptors which can detect variations in light intensity and frequency. As such, the light source illuminates a surface of the medium and the sensor array converts reflected light from the surface into electrical signals. Thus, the electrical signals can then be stored in a file, manipulated by programs, and/or used for reproduction of the image.

The conventional scanning system is often incorporated into peripheral devices such as copiers, scanners, facsimiles, or multi-functional peripheral devices which combine the functions of two or more of these devices. Such devices often include automatic document feeders which are used to automatically feed one or more loose sheets of the medium into the respective devices for processing. As such, the automatic document feeders require that the medium be oriented in a specific manner. More specifically, the automatic document feeders require that the medium be positioned in one of two orientations: face-up or face-down.

Unfortunately, the automatic document feeders of different devices often require different orientations of the medium for feeding the medium into the respective device. For example, some devices require that the medium be oriented face-up while other devices require that the medium be oriented face-down. Thus, a user of such devices must always be cognizant of the required orientation for feeding the medium into a particular device.

Understandably, if the user is required to sporadically, or even routinely, use multiple devices, the user may not always remember the required orientation for feeding the medium into the device being used. Thus, the user may not receive the desired output from the device. For example, if the user orients the medium face-up while the device requires that the medium be oriented face-down, the opposite side of the medium than that desired by the user will be processed, often to the chagrin of the user.

In addition, the conventional scanning system must process a group of medium including both single-sided images and double-sided images as a group of medium including all single-sided images or as a group of medium including all double-sided images. Unfortunately, processing the group of medium as medium including all single-sided images results in less than all of the images being processed. Thus, an integrity or completeness of the group of medium is diminished. To include the missing images, the medium including double-sided images must be reprocessed and the resulting images manually collated with the previously reproduced images.

In addition, processing the group of medium as medium including all double-sided images results in unnecessary routing of the medium through a duplexer only to reproduce blank images on a backside of the images being reproduced if double-sided output is selected. Thus, a throughput and/or performance of the system is degraded since all of the medium is routed through the duplexer regardless of whether the medium includes single-sided images or double-sided images.

Alternatively, processing the group of medium as medium including all double-sided images results in sheets of blank images being unnecessarily formed if single-sided output is selected. Understandably, these sheets of blank images represent a back-side of the medium having only single-sided images. Thus, resources of the system, namely print medium, are wasted since these sheets of blank images are often discarded.

Accordingly, a need exists for an image scanning system which scans a medium and reproduces an image of the medium regardless of an orientation of the medium. In addition, a need exists for an image scanning system which processes a group of medium including both single-sided images and double-sided images without compromising integrity or performance of the system and/or wasting resources.

SUMMARY OF THE INVENTION

One aspect of the present invention provides a system for scanning a medium. The system includes a first scanner adapted to scan a first side of the medium and a second scanner adapted to scan a second side of the medium. As such, the first scanner detects one of a presence and an absence of a first image on the first side of the medium and the second scanner detects one of a presence and an absence of a second image on the second side of the medium.

Another aspect of the present invention provides a method of scanning a medium. The method includes scanning a first side of the medium and scanning a second side of the medium. As such, scanning the first side of the medium includes detecting one of a presence and an absence of a first image on the first side of the medium and scanning the second side of the medium includes detecting one of a presence and an absence of a second image on the second side of the medium.

Another aspect of the present invention provides a system for reproducing an image disposed on at least one of a first side and a second side of a medium. The system includes a first scanner adapted to scan the first side of the medium and generate a first side data signal, a second scanner adapted to scan the second side of the medium and generate a second side data signal, and a controller adapted to receive the first side data signal and the second side data signal and generate an image reproduction data signal based on the first side data signal and the second side data signal. As such, if the image is disposed only on the first side of the medium, the first side data signal includes a first image signal and the second side data signal includes a blank signal. Thus, the image reproduction data signal includes the first image signal and the blank signal.

Another aspect of the present invention provides a method of reproducing an image disposed on at least one of a first side and a second side of a medium. The method includes scanning the first side of the medium and generating a first side data signal, scanning the second side of the medium and generating a second side data signal, and generating an image reproduction data signal based on the first side data signal and the second side data signal. As such, if the image is disposed on the first side of the medium and the second side of the medium is blank, generating the first side data signal includes generating a first image signal and generating the second side data signal includes generating a blank signal. Thus, generating the image reproduction data signal includes including the first image signal and the blank signal.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
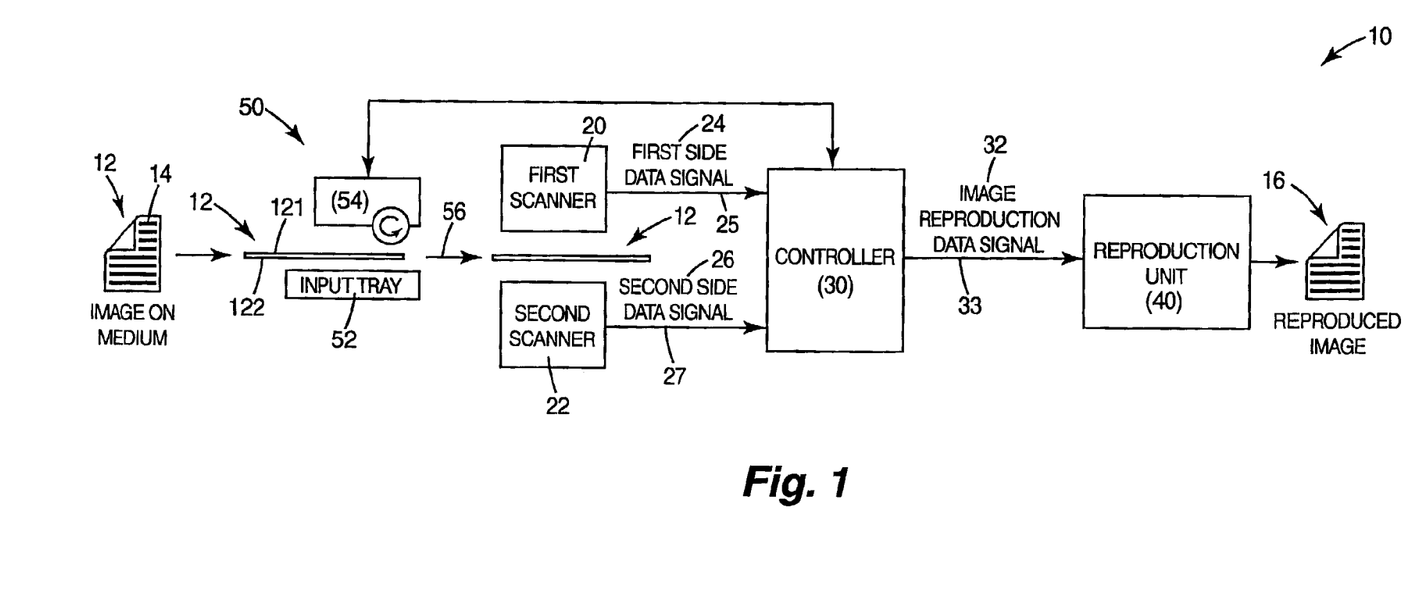
FIG. 1 is a schematic illustration of one embodiment of an image reproduction system according to the present invention.

FIG. 1 illustrates one embodiment of a portion of an image reproduction system 10 according to the present invention. Image reproduction system 10 facilitates scanning of a medium 12 and, if present, reproduction of an image 14 provided on medium 12. Image reproduction system 10 can be or can be included in a peripheral device such as a copier, a scanner, a facsimile, or other peripheral device, including a multi-functional peripheral device which combines the functions of two or more of these devices. Image reproduction system 10 incorporates dual scanners, as described below, to facilitate scanning of medium 12 and reproduction of image 14 provided on medium 12. In addition, the use of dual scanners improves the usability or convenience of use of a device incorporating image reproduction system 10.

Medium 12, as used herein, is defined to include any type of material upon which any pictorial, graphical, and/or textural image may be provided. Medium 12, therefore, is defined to include any type of sheet material such as paper, including photographic paper, card stock, transparencies, Mylar, cloth, and the like. In one embodiment, medium 12 is a sheet of paper and, as such, has a first side 121 and a second side 122. In addition, medium 12 may be one of a plurality of sheets in a document.

Image 14, as used herein, is defined to include any pictorial, graphical, and/or textural characters, symbols, illustrations, and/or other representation of information. For illustrative purposes and clarity of the invention, image 14 is illustrated schematically as a plurality of solid lines.

In one embodiment, image reproduction system 10 includes a first scanner 20, a second scanner 22, a controller 30, and a reproduction unit 40. First scanner 20 and second scanner 22 each include, for example, a light source (not shown) which illuminates a respective side of medium 12 and a sensor array (not shown), such as a charge coupled device (CCD), which converts reflected light into electrical signals, as is well known in the art. As such, first scanner 20 and second scanner 22 are configured to scan medium 12 and convert image 14 into electrical signals which, in turn, are input to controller 30, as described below. Thus, controller 30 processes the electrical signals and provides input to reproduction unit 40 for reproduction of image 14 as a reproduced image 16.

First scanner 20 is arranged for scanning first side 121 of medium 12 and second scanner 22 is arranged for scanning second side 122 of medium 12. As such, first scanner 20 scans first side 121 and generates a first side data signal 24 and second scanner 22 scans second side 122 and generates a second side data signal 26. First side data signal 24 and second side data signal 26, therefore, represent a captured image of medium 12. Thus, first scanner 20 and second scanner 22 detect the presence and/or absence of image 14 on medium 12, as described below.

In one embodiment, first scanner 20 and second scanner 22 scan first side 121 and second side 122, respectively, at substantially the same or approximately the same time. It is, however, within the scope of the present invention for first scanner 20 and second scanner 22 to scan first side 121 and second side 122, respectively, at different times.

Controller 30 includes hardware, software, firmware, or a combination of these. In addition, controller 30 includes logic circuitry which responds to and processes instructions for controlling image reproduction system 10. As such, controller 30 can be or can be included in a computer or other microprocessor-based system capable of performing a sequence of logic operations.

In one embodiment, first side data signal 24 and second side data signal 26 are input to controller 30. As such, controller 30 processes first side data signal 24 and second side data signal 26, and generates an image reproduction data signal 32 based on first side data signal 24 and second side data signal 26. Thus, image reproduction data signal 32 includes data for reproduction of image 14. Accordingly, image reproduction data signal 32 is input to reproduction unit 40 which, in turn, processes image reproduction data signal 32 and produces reproduced image 16, as described below. In one embodiment, first side data signal 24 and second side data signal 26 are input to controller 30 from first scanner 20 and second scanner 22 via signal lines 25 and 27, respectively, and image reproduction data signal 32 is input to reproduction unit 40 from controller 30 via a signal line 33.

First scanner 20 and second scanner 22, controller 30, and reproduction unit 40 may be or may be included in a single device or may form portions of different devices. As such, first scanner 20 and second scanner 22, controller 30, and reproduction unit 40 may be located remote from each other (i.e., at different locations). For example, if image reproduction system 10 is incorporated into a facsimile system, first scanner 20 and second scanner 22 and controller 30 may be located at one location as part of a first facsimile device and reproduction unit 40 may be located at another location as part of a second facsimile device. Signal lines 25 and 27, and/or signal line 33, therefore, can include or can be included in a local-area network (LAN) and/or a wide-area network (WAN) and may include an intranet communication link, an Internet communication link, or similar high-speed communication link including a wireless communication link. First scanner 20 and second scanner 22, controller 30, and/or reproduction unit 40, however, may communicate with each other in other manners (e.g., direct connections or communication links).

In one embodiment, as illustrated in FIG. 1, image reproduction system 10 includes an automatic document feeder (ADF) 50. ADF 50 includes an input tray 52 for receiving medium 12 and a medium transport mechanism 54 for routing or feeding medium 12 through image reproduction system 10 from input tray 52. As such, first scanner 20 and second scanner 22 are held stationary as medium 12 is advanced relative to first scanner 20 and second scanner 22. More specifically, ADF 50 routes medium 12 along a feed path, as indicated by arrow 56, and positions medium 12 between first scanner 20 and second scanner 22. Thus, first scanner 20 and second scanner 22 are positioned on opposite sides of feed path 56 and, more specifically, opposite sides of medium 12. In another embodiment, medium 12 is held stationary as first scanner 20 and second scanner 22 are moved relative to medium 12. As such, first scanner 20 and second scanner 22 are positioned on opposite sides of medium 12.

It is to be understood that FIG. 1 is a simplified schematic illustration of one embodiment of image reproduction system 10, including first scanner 20 and second scanner 22. For example, while first scanner 20 and second scanner 22 are illustrated as being positioned above and below medium 12, first scanner 20 and second scanner 22 may be positioned in other orientations. For example, first scanner 20 and second scanner 22 may be oriented and medium 12 may be routed such that first scanner 20 and second scanner 22 are positioned to the right and the left of medium 12. Regardless of their orientation, first scanner 20 and second scanner 22 are positioned on opposite sides of medium 12. In addition, while first scanner 20 and second scanner 22 are illustrated as being directly opposite of each other, it is within the scope of the present invention for first scanner 20 and second scanner 22 to be offset relative to each other. Furthermore, first scanner 20 and second scanner 22 may be included as part of ADF 50.

Figure 2:
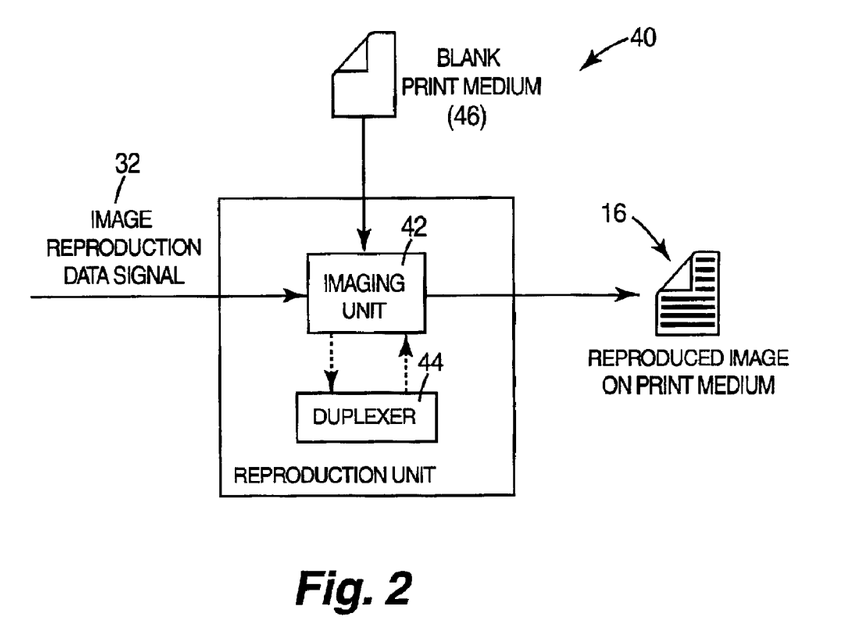
FIG. 2 is a schematic illustration of one embodiment of a reproduction unit of the image reproduction system of FIG. 1.

In one embodiment, image reproduction system 10 forms part of a copier. As such, reproduced image 16 includes a printed image. Thus, as illustrated in FIG. 2, one embodiment of reproduction unit 40 includes an imaging unit 42 and a duplexer 44. Imaging unit 42 produces an image in response to data signals and duplexer 44 facilitates printing of an image by orienting print medium for imaging unit 42. As such, imaging unit 42 receives image reproduction data signal 32 and blank print medium 46 as input. Thus, imaging unit 42 processes image reproduction data signal 32 and prints image 14 on print medium 46 based on image reproduction data signal 32. Reproduction unit 40, therefore, reproduces image 14 as a printed image on print medium 46.

For double-sided printing, imaging unit 42 routes print medium 46 through duplexer 44. More specifically, after printing on a first side of print medium 46, imaging unit 42 routes print medium 46 through duplexer 44 which re-orients print medium 46 for printing on a second side thereof. Thereafter, imaging unit 42 prints on the second side of print medium 46.

Figure 3:
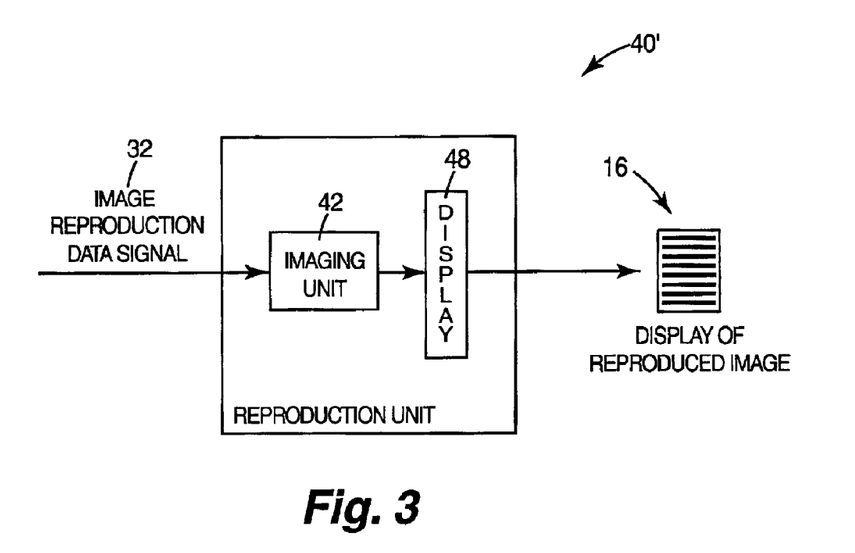
FIG. 3 is a schematic illustration of another embodiment of a reproduction unit of the image reproduction system of FIG. 1.

In another embodiment, image reproduction system 10 forms part of a scanner. As such, reproduced image 16 includes a displayed image. Thus, as illustrated in FIG. 3, another embodiment of reproduction unit 40, illustrated as reproduction unit 40', includes imaging unit 42, as described above, and a display 48. Display 48 may form part of a computer associated with image reproduction system 10. As such, imaging unit 42 receives image reproduction data signal 32 and processes image reproduction data signal 32 to display image 14 on display 48. Reproduction unit 40', therefore, reproduces image 14 as a displayed image on display 48.

Figure 4A:
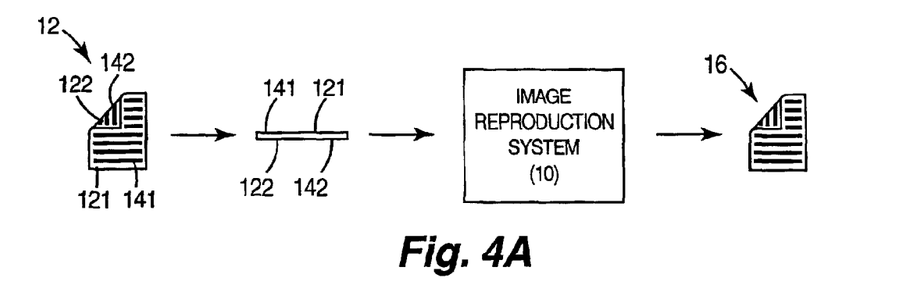
FIG. 4A is a schematic illustration of one embodiment of processing of a medium by the image reproduction system of FIG. 1.

FIGS. 4A–4D illustrate different embodiments of processing of medium 12 and, if present, reproduction of image 14. In FIG. 4A, image 14 is a double-sided image and includes a first image 141 on first side 121 of medium 12 and a second image 142 on second side 122 of medium 12. As such, first scanner 20 scans first side 121 and second scanner 22 scans second side 122. Thus, first scanner 20 detects first image 141 and second scanner 22 detects second image 142. Image reproduction system 10, therefore, reproduces image 14 as a double-sided reproduced image 16. It is, however, within the scope of the present invention for image reproduction system 10 to reproduce image 14, in FIG. 4A, as two single-sided images. The double-sided image or single-sided images, as reproduced by image reproduction system 10, may be printed and/or displayed, as described above.

Figure 4B:
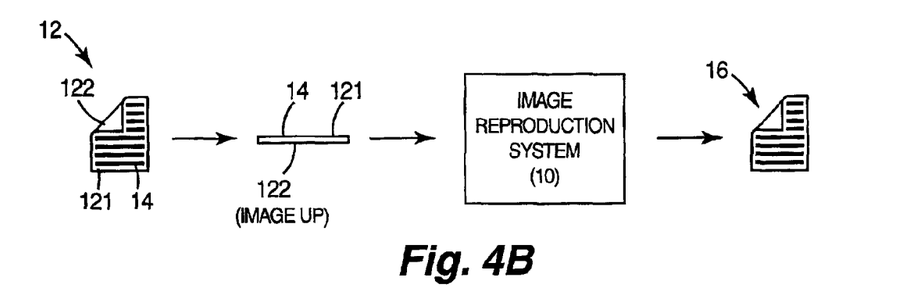
FIG. 4B is a schematic illustration of another embodiment of processing of a medium by the image reproduction system of FIG. 1.

In FIG. 4B, image 14 is a single-sided image provided on first side 121 of medium 12. Thus, second side 122 of medium 12 is blank. In one embodiment, medium 12 is oriented such that image 14 is facing upward (i.e., face-up) for input to image reproduction system 10. As such, first scanner 20 scans first side 121 and second scanner 22 scans second side 122. Thus, only first scanner 20 detects image 14. Image reproduction system 10, therefore, reproduces image 14 as a single-sided reproduced image 16. The single-sided image may be printed and/or displayed, as described above.

Figure 4C:
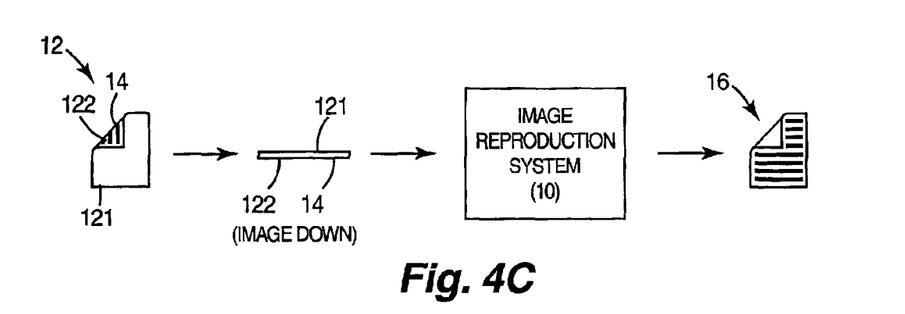
FIG. 4C is a schematic illustration of another embodiment of processing of a medium by the image reproduction system of FIG. 1.

In FIG. 4C, image 14 is a single-sided image provided on second side 122 of medium 12. Thus, first side 121 of medium 12 is blank. In one embodiment, medium 12 is oriented such that image 14 is facing downward (i.e., face-down) for input to image reproduction system 10. As such, first scanner 20 scans first side 121 and second scanner 22 scans second side 122. Thus, only second scanner 22 detects image 14. Image reproduction system 10, therefore, reproduces image 14 as a single-sided reproduced image 16. The single-sided image may be printed and/or displayed, as described above. Thus, regardless of whether medium 12 is oriented face-up, as illustrated in FIG. 4B, or face-down, as illustrated in FIG. 4C, output of image reproduction system 10 is the same. Namely, reproduced image 16 is a single-sided reproduced image with image 14 being reproduced on a front side.

Figure 4D:
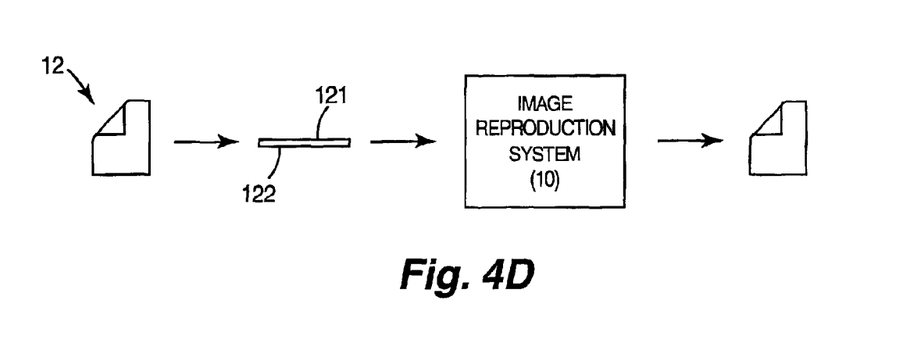
FIG. 4D is a schematic illustration of another embodiment of processing of a medium by the image reproduction system of FIG. 1.

In FIG. 4D, image 14 is blank. More specifically, both first side 121 and second side 122 of medium 12 are blank. As such, first scanner 20 scans first side 121 and second scanner 22 scans second side 122. Thus, neither first scanner 20 nor second scanner 22 detect image 14. Image reproduction system 10, therefore, reproduces a blank image. The blank image may include, for example, a blank sheet of print medium and/or a blank display.

FIGS. 5A and 5B, and FIGS. 5C–5E illustrate processing of a group of medium 12 by a prior art reproduction system 90 and by image reproduction system 10, respectively. In FIGS. 5A–5E, medium 12 includes a first medium 12a, a second medium 12b, and a third medium 12c. As such, first medium 12a includes a first image 14a, second medium 12b includes a second image 14b, and third medium 12c includes a third image 14c. In one embodiment, image 14a is a single-sided image provided on a first side 121a of first medium 12a, image 14b is a single-sided image provided on a first side 121b of second medium 12b, and third image 14c is a double-sided image including a first image 141c provided on a first side 121c of third medium 12c and a second image 142c provided on a second side 122c of third medium 12c. Thus, second sides 122a and 122b of first and second mediums 12a and 12b, respectively, are blank. The group of medium 12, therefore, forms a mixed mode group of medium.

Figure 5A:
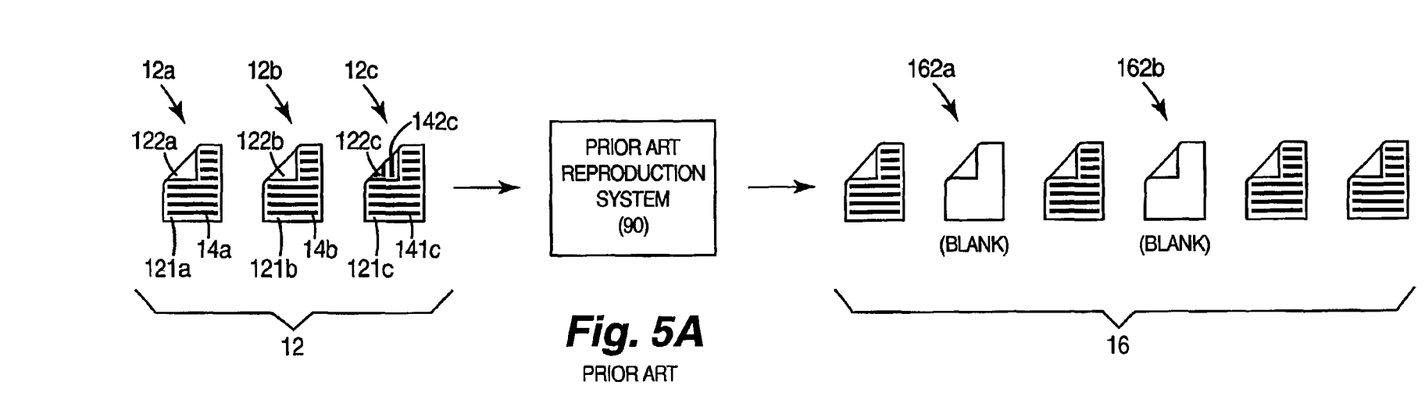
FIG. 5A is a schematic illustration of one embodiment of processing a group of medium by a prior art reproduction system.

As the group of medium 12 includes single-sided and double-sided images, reproduction of the group of medium 12, as a whole, with prior art reproduction system 90, requires that the group of medium 12 be reproduced as double-sided images or as single-sided images. As illustrated in FIG. 5A, if the group of medium 12 is reproduced with prior art reproduction system 90 as double-sided images to single-sided images, blank images are formed. More specifically, as second sides 122a and 122b of first and second mediums 12a and 12b, respectively, are blank, reproduced images 16 include blank images 162a and 162b. Thus, blank images 162a and 162b must be manually discarded.

Figure 5B:
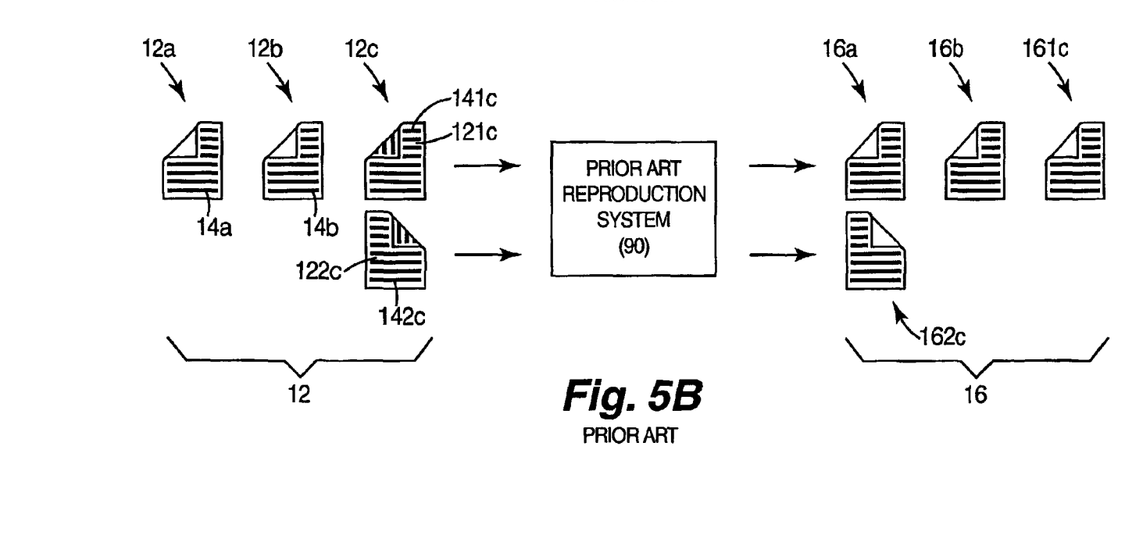
FIG. 5B is a schematic illustration of one embodiment of processing a group of medium by a prior art reproduction system.

As illustrated in FIG. 5B, if the group of medium 12 is reproduced with prior art reproduction system 90 as single-sided images to single-sided images, the group of medium 12 must be processed in two steps and then manually assembled or collated. More specifically, first sides 121a, 121b, and 121c of first, second, and third mediums 12a, 12b, and 12c, respectively, must first be processed to reproduce images 14a, 14b, and 141c, as reproduced images 16a, 16b, and 161c, respectively. In addition, second side 122c of third medium 12c must be processed separately to reproduce image 142c as reproduced image 162c. As such, reproduced images 16a, 16b, 161c, and 162c must be manually assembled or collated.

Figure 5C:
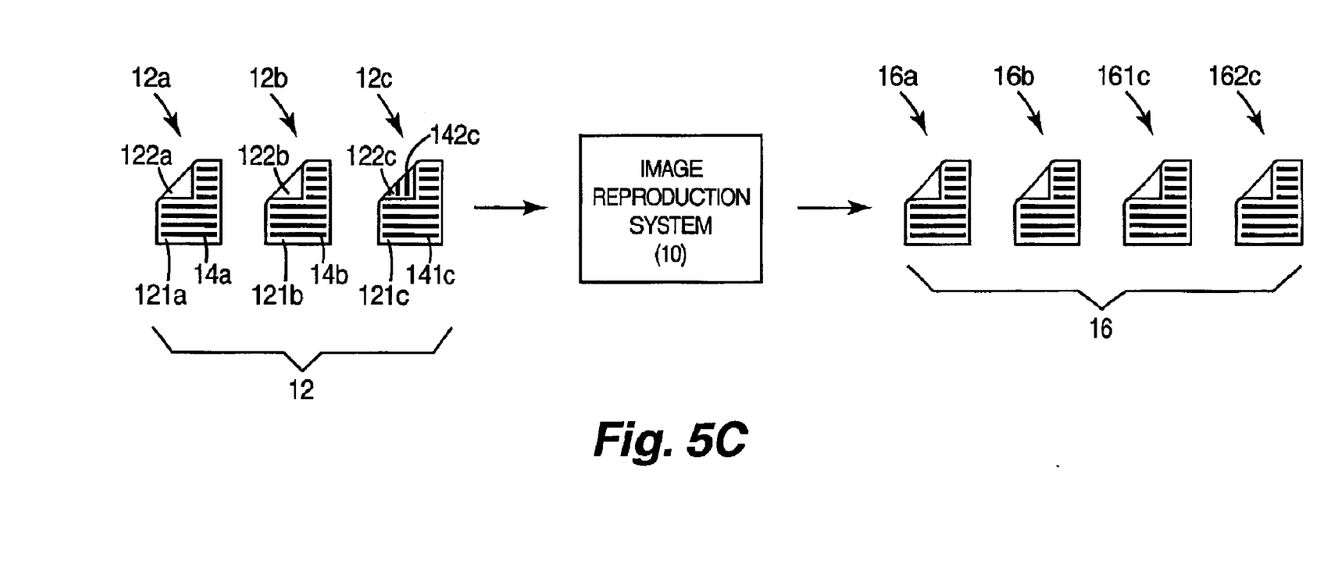
FIG. 5C is a schematic illustration of one embodiment of processing a group of medium by the image reproduction system of FIG. 1.

Although the group of medium 12 includes single-sided and double-sided images, reproduction of the group of medium 12 with image reproduction system 10 automatically compensates for the mix of medium 12. As illustrated in FIG. 5C, the group of medium 12 is reproduced by image reproduction system 10 as single-sided images in one step without blank images. More specifically, image reproduction system 10 automatically senses the presence and/or absence of first, second, and third images 14a, 14b, and 14c on first, second, and third mediums 12a, 12b, and 12c, respectively. As such, image reproduction system 10 automatically reproduces images 14a, 14b, 141c, and 142c as reproduced images 16a, 16b, 161c, and 162c, respectively, without blank images.

Figure 5D:
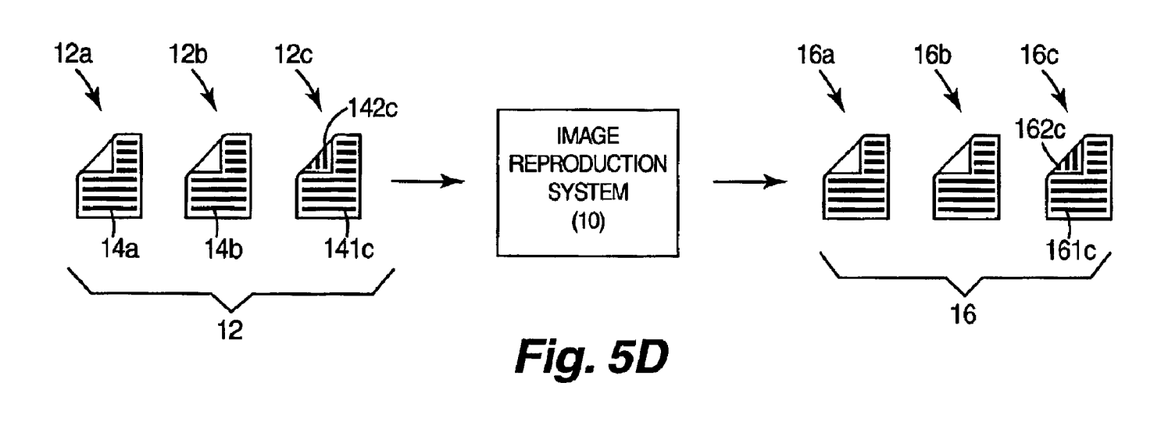
FIG. 5D is a schematic illustration of one embodiment of processing a group of medium by the image reproduction system of FIG. 1.

In addition, as illustrated in FIG. 5D, the group of medium 12 is reproduced by image reproduction system 10 as mixed single-sided and double-sided images during one process. More specifically, first medium 12a is processed as a single-sided image to reproduce image 14a as reproduced image 16a, second medium 12b is processed as a single-sided image to reproduce image 14b as reproduced image 16b, and third medium 12c is processed as a double-sided image to reproduce images 141c and 142c as reproduced images 161c and 162c, respectively, of reproduced image 16c.

Figure 5E:
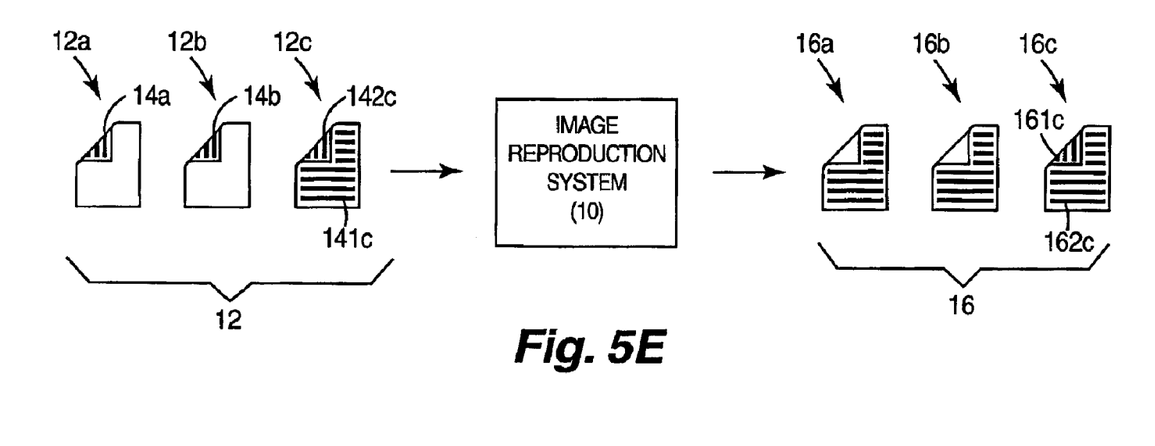
FIG. 5E is a schematic illustration of one embodiment of processing a group of medium by the image reproduction system of FIG. 1.

Furthermore, as illustrated in FIG. 5E, the group of medium 12 is reproduced by image reproduction system 10 as mixed single-sided and double-sided images during one process. More specifically, first medium 12a is processed as a single-sided image to reproduce image 14a as reproduced image 16a, second medium 12b is processed as a single-sided image to reproduce image 14b as reproduced image 16b, and third medium 12c is processed as a double-sided image to reproduce images 141c and 142c as reproduced images 161c and 162c, respectively, of reproduced image 16c. Thus, regardless of whether the mixed mode group of medium 12 is oriented face-up, as illustrated in FIG. 5D, or face-down, as illustrated in FIG. 5E, output of image reproduction system 10 is the same. Namely, reproduced image 16a is a single-sided reproduced image, reproduced image 16b is a single-sided reproduced image, and reproduced image 16c is a double-sided reproduced image. It is understood that flipping the output images may reverse the order of the medium in a face-down output tray. Solutions for re-ordering the medium in an output tray and/or redirecting the medium to another face-up output tray are well known to those skilled in the art.

Figure 6:
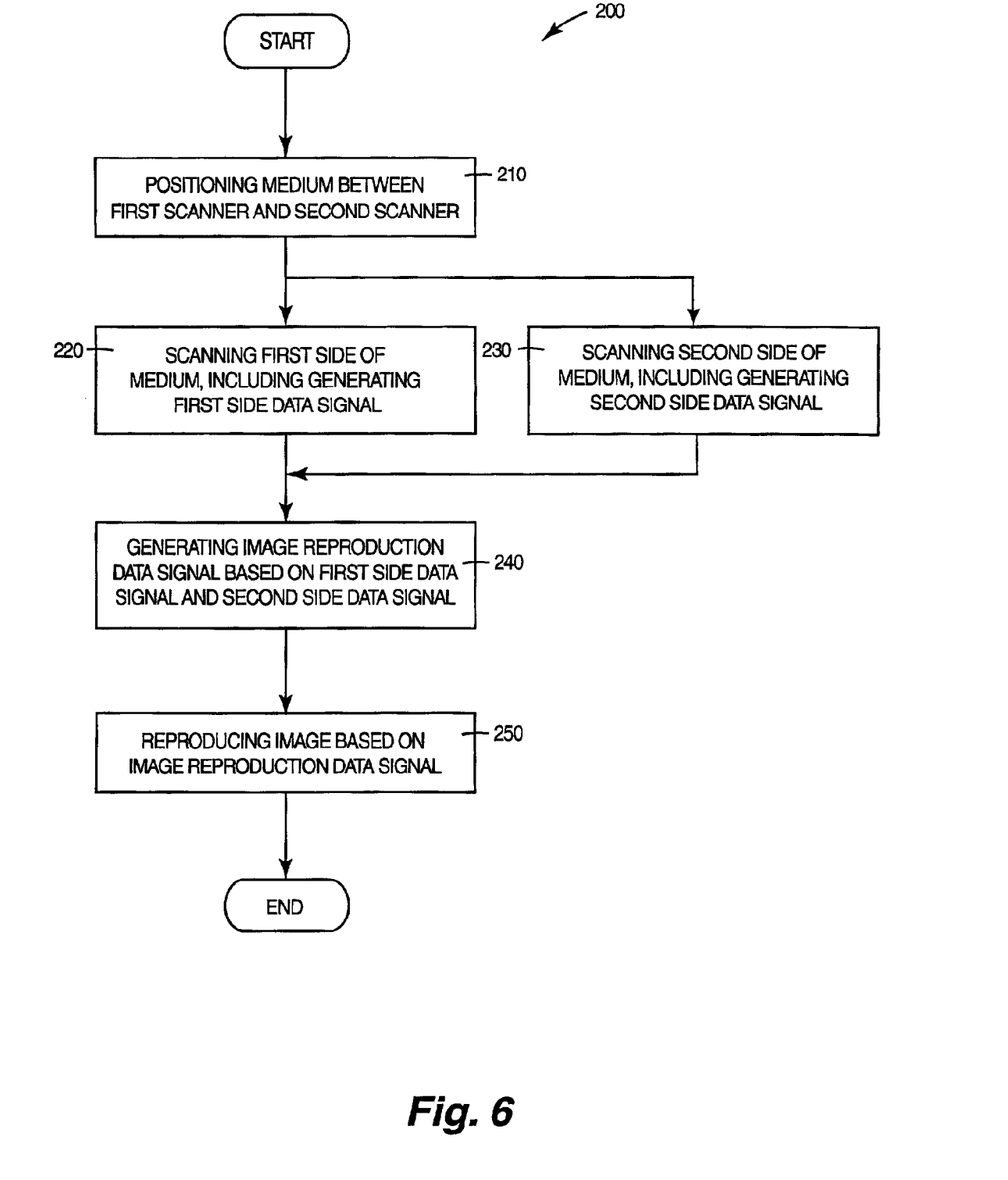
FIG. 6 is a flow diagram illustrating one embodiment of a method of scanning and reproducing an image of a medium according to the present invention.

FIG. 6 illustrates one embodiment of a method 200 of scanning medium 12 and reproducing image 14 of medium 12 according to the present invention. Reference is also made to FIGS. 1–5. At step 210, medium 12 is positioned between first scanner 20 and second scanner 22. In one embodiment, medium 12 is positioned on input tray 52 of automatic document feeder 50 such that medium transport mechanism 54 automatically feeds or routes medium 12 between first scanner 20 and second scanner 22. As such, automatic document feeder 50 positions medium 12 between first scanner 20 and second scanner 22.

In another embodiment, medium 12 is manually positioned between first scanner 20 and second scanner 22. Medium 12 is positioned, for example, on a transparent platen (platen) which is provided above second scanner 22. Second scanner 22, therefore, is positioned on one side of medium 12. As such, first scanner 20 is positioned on the opposite side of medium 12. Thus, medium 12 is positioned between first scanner 20 and second scanner 22.

At step 220, first side 121 of medium 12 is scanned and, at step 230, second side 122 of medium 12 is scanned. In one embodiment, first side 121 and second side 122 are each scanned simultaneously at substantially the same or approximately the same time. It is, however, within the scope of the present invention for first side 121 and second side 122 to be scanned at different times. As described above, first side 121 is scanned by first scanner 20 and second side 122 is scanned by second scanner 22 to detect image 14. As such, first side data signal 24 and second side data signal 26 are generated. First side data signal 24 and second side data signal 26 represent a conversion of image 14, if present, on first side 121 and/or second side 122, respectively, of medium 12 into electrical signals, as described above.

At step 240, image reproduction data signal 32 is generated. Image reproduction data signal 32 is generated based on first side data signal 24 and second side data signal 26. In one embodiment, image reproduction data signal 32 is generated by controller 30. As such, first side data signal 24 and second side data signal 26 are input to controller 30 from first scanner 20 and second scanner 22. First side data signal 24 and second side data signal 26 are input to controller 30 via, for example, signal lines 25 and 27, respectively, as illustrated in FIG. 1.

At step 250, image 14 of medium 12 is reproduced. Image 14, if present, is reproduced based on image reproduction data signal 32. As such, image reproduction data signal 32 is input to reproduction unit 40, including reproduction unit 40'. Image reproduction data signal 32 is input to reproduction unit 40 via, for example, signal line 33, as illustrated in FIG. 1.

In one embodiment, image reproduction system 10 includes reproduction unit 40. As such, reproduction of image 14 includes printing of image 14 on print medium 46 by imaging unit 42, as described above with reference to FIG. 2. In another embodiment, image reproduction system 10 includes reproduction unit 40'. As such, reproduction of image 14 includes display of image 14 by display 48, as described above with reference to FIG. 3.

Figure 7:
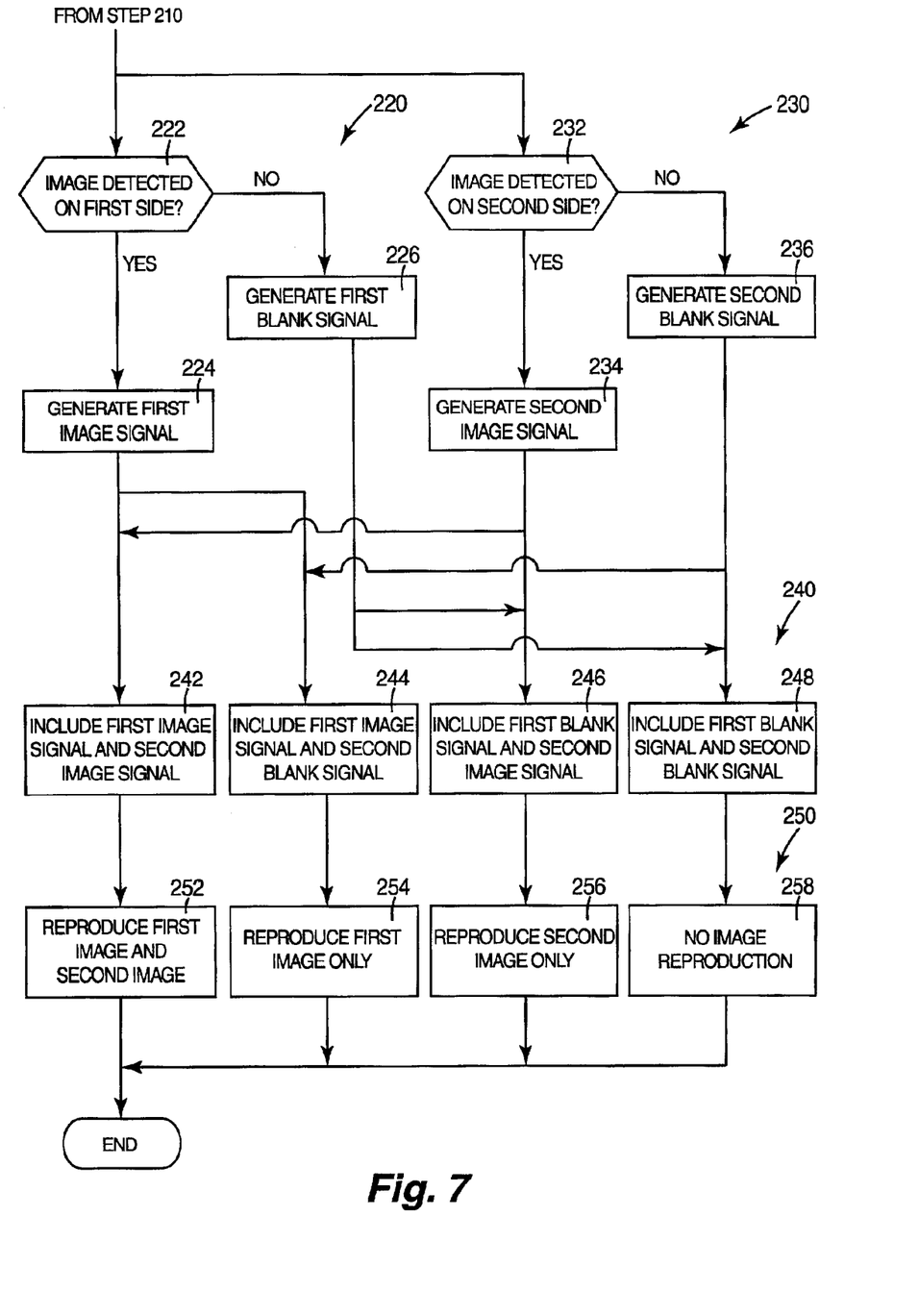
FIG. 7 is a flow diagram illustrating portions of the method of FIG. 6.

FIG. 7 illustrates one embodiment of scanning first and second sides 121 and 122 and generating first side and second side data signals 24 and 26, respectively, in steps 220 and 230, generating image reproduction data signal 32 in step 240, and reproducing image 14 in step 250. More specifically, scanning first side 121 and generating first side data signal 24 in step 220 includes assessing whether image 14 has been detected on first side 121, as indicated in step 222. If image 14 is detected on first side 121, a first image signal is generated, as indicated in step 224. The first image signal represents the presence of image 14 on first side 121. If, however, image 14 is not detected on first side 121, a first blank signal is generated, as indicated in step 226. The first blank signal represents the absence or lack of image 14 on first side 121. In addition, scanning second side 122 and generating second side data signal 26 in step 230 includes assessing whether image 14 has been detected on second side 122, as indicated in step 232. If image 14 is detected on second side 122, a second image signal is generated, as indicated in step 234. The second image signal represents the presence of image 14 on second side 122. If, however, image 14 is not detected on second side 122, a second blank signal is generated, as indicated in step 236. The second blank signal represents the absence or lack of image 14 on second side 122.

In one embodiment, generating image reproduction data signal 32 in step 240 includes generating at least one of four image reproduction data signals, as indicated in steps 242, 244, 246, and 248. More specifically, if image 14 is detected on both first side 21 and second side 122, as assessed in steps 222 and 232, respectively, image reproduction data signal 32 is generated, as indicated in step 242, so as to include the first image signal and the second image signal, as generated in steps 224 and 234, respectively. If, however, image 14 is detected only on first side 121 and second side 122 is blank, as assessed in steps 222 and 232, respectively, image reproduction data signal 32 is generated, as indicated in step 244, so as to include the first image signal and the second blank signal, as generated in steps 224 and 236, respectively. In addition, if first side 121 is blank and image 14 is detected only on second side 122, as assessed in steps 222 and 232, respectively, image reproduction data signal 32 is generated, as indicated in step 246, so as to include the first blank signal and the second image signal, as generated in steps 226 and 234, respectively. Furthermore, if first side 121 and second side 122 are both blank, as assessed in steps 222 and 232, respectively, image reproduction data signal 32 is generated, as indicated in step 248, so as to include the first blank signal and the second blank signal, as generated in steps 226 and 236, respectively.

Reproducing image 14 in step 250 includes reproducing image 14 based on image reproduction data signals 32, as generated in steps 242, 244, 246, and 248. More specifically, if image reproduction data signal 32 includes the first image signal and the second image signal, as indicated in step 242, reproducing image 14 in step 250 includes reproducing both first image 141 and second image 142, as indicated in step 252. If, however, image reproduction data signal 32 includes the first image signal and the second blank signal, as indicated in step 244, reproducing image 14 in step 250 includes only reproducing first image 141, as indicated in step 254. In addition, if image reproduction data signal 32 includes the first blank signal and the second image signal, as indicated in step 246, reproducing image 14 in step 250 includes only reproducing second image 142, as indicated in step 256. Furthermore, if image reproduction data signal 32 includes the first blank signal and the second blank signal, as indicated in step 248, reproducing image 14 in step 250 includes no image reproduction, as indicated in step 258.

Figure 8:
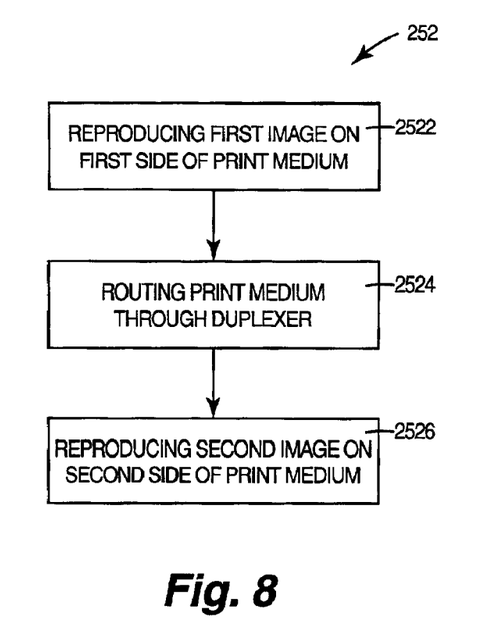
FIG. 8 is a flow diagram illustrating one embodiment of image reproduction in the method of FIG. 7.

In one embodiment, as illustrated in FIG. 8, reproducing first image 141 and second image 142 in step 252 includes reproducing first image 141 on a first side of print medium 46, as indicated in step 2522, routing print medium 46 through duplexer 44, as indicated in step 2524, and reproducing second image 142 on a second side of print medium 46, as indicated in step 2526.

Figure 9:
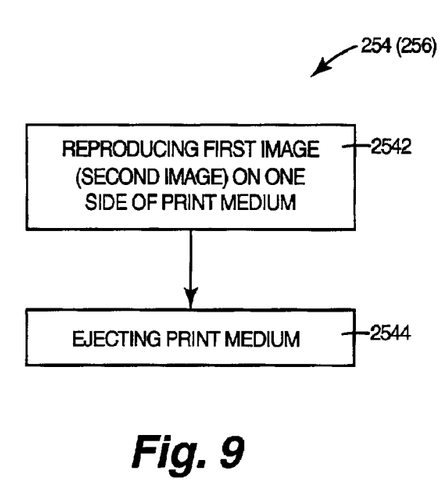
FIG. 9 is a flow diagram illustrating another embodiment of image reproduction in the method of FIG. 7.

In one embodiment, as illustrated in FIG. 9, reproducing first image 141 (or second image 142) in step 254 (or step 256) includes reproducing first image 141 (or second image 142) on one side of print medium 46, as indicated in step 2542, and then ejecting print medium 46, as indicated in step 2544. As such, print medium 46 is not routed through duplexer 44.

Figure 10:
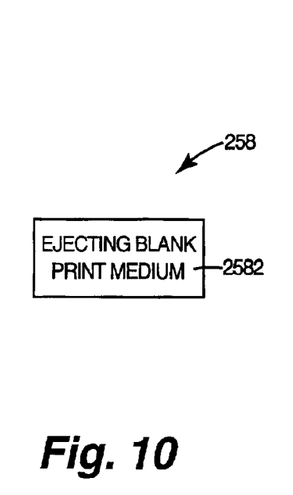
FIG. 10 is a flow diagram illustrating another embodiment of image reproduction in the method of FIG. 7.

In one embodiment, as illustrated in FIG. 10, no image reproduction in step 258 includes automatically ejecting a blank print medium 46, as indicated in step 2582. As such, print medium 46 is not routed through imaging unit 42 and/or duplexer 44 of reproduction unit 40.

By including both first scanner 20 and second scanner 22 in image reproduction system 10, the presence or absence of image 14 on first side 121 as well as second side 122 of medium 12 is automatically detected. Thus, regardless of whether medium 12 is oriented face-up or face-down, first scanner 20 or scanner 22 will detect image 14, if present. As such, when image reproduction system 10 includes automatic document feeder 50, medium 12 can be positioned on input tray 52 in either a face-up or face-down orientation. Accordingly, with image reproduction system 10, it is not necessary for a user of a device incorporating image reproduction system 10 to remember a required orientation for positioning of medium in the respective device.

In addition, by including both first scanner 20 and second scanner 22 in image reproduction system 10 and automatically detecting the presence or absence of image 14 on medium 12, a group of medium including both single-sided images and double-sided images can be effectively and efficiently processed. More specifically, image reproduction system 10 reproduces the group of medium as single-sided images in one step without missing any of the images and without forming blank images. Thus, an integrity or completeness of the group of medium is retained and resources such as blank print medium are not wasted.

Alternatively, image reproduction system 10 reproduces the group of medium as mixed single-sided and double-sided images during one process without having to unnecessarily route all of the print medium through duplexer 44. More specifically, the only print medium that is routed through duplexer 44 is that print medium which is to receive double-sided images. Thus, a throughput and/or performance of a device incorporating image reproduction system 10 is enhanced. Accordingly, image reproduction system 10 or a device incorporating image reproduction system 10 can process a group of medium including both single-sided images and double-sided images without compromising integrity or performance of the system and/or wasting resources.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of reproducing an image disposed on at least one of a first side and a second side of medium, the method comprising:

scanning the first side of the medium, including generating a first side data signal;

scanning the second side of the medium, including generating a second side data signal;

generating an image reproduction data signal based on the first side data signal and the second side data signal; and reproducing the image based on the image reproduction data signal, wherein, if the image is disposed on the first side of the medium and the second side of the medium is blank, generating the first side data signal includes generating a first image signal and generating the second side data signal includes generating a blank signal, and wherein reproducing the image includes reproducing the image based on the first image signal including displaying the image, and, in response to the blank signal, discontinuing reproducing the image including preventing display of a blank image.

2. A system for reproducing an image disposed on at least one of a first side and a second side of a medium, the system comprising:

a first scanner adapted to scan the first side of the medium and generate a first side data signal;

a second scanner adapted to scan the second side of the medium and generate a second side data signal;

a controller adapted to receive the first side data signal and the second side data signal and generate an image reproduction data signal based on the first side data signal and the second side data signal; and a reproduction unit adapted to receive the image reproduction data signal and reproduce the image based on the image reproduction data signal, wherein, if the image is disposed only on the first side of the medium and the second side of the medium is blank, the first side data signal includes a first image signal and the second side data signal includes a blank signal, and wherein the reproduction unit is adapted to reproduce and print the image on a first side of a print medium based on the first image signal and, in response to the blank signal, discontinue reproduction of the image and eject the print medium.

3. A system for reproducing an image disposed on at least one of a first side and a second side of a medium, the system comprising:

a first scanner adapted to scan the first side of the medium and generate a first side data signal;

a second scanner adapted to scan the second side of the medium and generate a second side data signal;

a controller adapted to receive the first side data signal and the second side data signal and generate an image reproduction data signal based on the first side data signal and the second side data signal; and a reproduction unit adapted to receive the image reproduction data signal and reproduce the image based on the image reproduction data signal, wherein, if the image is disposed only on the first side of the medium and the second side of the medium is blank, the first side data signal includes a first image signal and the second side data signal includes a blank signal, and wherein the reproduction unit is adapted to reproduce and display the image based on the first image signal and, in response to the blank signal, discontinue reproduction of the image and prevent display of a blank image.

4. A method of reproducing an image disposed on at least one of a first side and a second side of a medium, the method comprising:

scanning the first side of the medium, including generating a first side data signal;

scanning the second side of the medium, including generating a second sides data signal;

generating an image reproduction data signal based on the first side data signal and the second side data signal; and reproducing the image based on the image reproduction data signal, wherein, if the image is disposed on the first side of the medium and the second side of the medium is blank, generating the first side data signal includes generating a first image signal and generating the second side data signal includes generating a blank signal, and wherein reproducing the image includes reproducing the image based on the first image signal including printing the image on a first side of a print medium, and, in response to the blank signal, discontinuing reproducing the image including ejecting the print medium after printing the image on the first side of the print medium.

5. A system for reproducing an image disposed on at least one of a first side and a second side of a medium, the system comprising:

a first scanner adapted to scan the first side of the medium and generate a first side data signal;

a second scanner adapted to scan the second side of the medium and generate a second side data signal;

a controller adapted to receive the first side data signal and the second side data signal and generate an image reproduction data signal based on the first side data signal and the second side data signal; and a reproduction unit adapted to receive the image reproduction data signal and reproduce the image based on the image reproduction data signal, wherein, if the image is disposed only on the first side of the medium and the second side of the medium is blank, the first side data signal includes a first image signal and the second side data signal includes a blank signal, wherein the image reproduction data signal includes the first image signal and the blank signal, and wherein the reproduction unit is adapted to reproduce the image based on the first image signal and, in response to the blank signal, discontinue reproduction of the image, and wherein, if the first side and the second side of the medium are both blank, the first side data signal includes a first blank signal and the second side data signal includes a second blank signal, wherein the image reproduction data signal includes the first blank signal and the second blank signal, and wherein, in response to the first blank signal and the second blank signal, the reproduction unit is adapted to discontinue reproduction of the image.

6. The system of claim 5, wherein the first scanner and the second scanner are adapted to substantially simultaneously scan the first side of the medium and the second side of the medium.

7. The system of claim 5, wherein, if the image is disposed on both the first side and the second side of the medium, the first side data signal includes the first image signal and the second side data signal includes a second image signal, wherein the image reproduction data signal includes the first image signal and the second image signal, and wherein the reproduction unit is adapted to reproduce the image based on the first image signal and the second image signal.

8. The system of claim 5, wherein, in response to the first blank signal and the second blank signal, the reproduction unit is adapted to eject a blank print medium.

9. The system of claim 5, further comprising:

an automatic document feeder adapted to receive the medium and position the medium between the first scanner and the second scanner.

10. A method of reproducing an image disposed on at least one of a first side and a second side or a medium, the method comprising:

scanning the first side of the medium, including generating a first side data signal;

scanning the second side of the medium, including generating a second side data signal;

generating an image reproduction data signal based on the first side data signal and the second side data signal; and reproducing the image based on the image reproduction data signal, wherein, if the image is disposed on the first side of the medium and the second side of the medium is blank, generating the first side data signal including a first image signal and generating the second side data signal includes generating a blank signal, and wherein, if the first side and the second side of the medium are both blank, generating the first side data signal includes generating a first blank signal and generating the second side data signal includes generating a second blank signal, wherein reproducing the image includes, in response to the first blank signal and the second blank signal, discontinuing reproducing the image.

11. The method of claim 10, wherein scanning the first side of the medium and scanning the second side of the medium occur substantially simultaneously.

12. The method of claim 10, wherein scanning the first side of the medium includes scanning the first side of the medium with a first scanner, and wherein scanning the second side of the medium includes scanning the second side of the medium with a second scanner, and further comprising:

positioning the medium between the first scanner and the second scanner.

13. The method of claim 10, wherein, if the image is disposed on both the first side and the second side of the medium, generating the first side data signal includes generating the first image signal and generating the second side data signal includes generating a second image signal, wherein generating the image reproduction data signal includes including the first image signal and the second image signal.

14. The method of claim 13, further comprising:

reproducing the image based on the image reproduction data signal, including reproducing the image based on the first image signal and the second image signal.

* * * * *

UNITED STATES PATENT AND TRADEMARK OFFICE
CERTIFICATE OF CORRECTION

| | | |
|---|---|---|
| PATENT NO. | : 6,856,423 B2 | Page 1 of 1 |
| APPLICATION NO. | : 09/938981 | |
| DATED | : February 15, 2005 | |
| INVENTOR(S) | : Bradley J. Anderson et al. | |

It is certified that error appears in the above-identified patent and that said Letters Patent is hereby corrected as shown below:

In column 11, line 47, in Claim 1, after "side of" insert -- a --.

In column 12, line 56, in Claim 4, delete "sides" and insert -- side --, therefor.

In column 14, line 6, in Claim 10, delete "or" and insert -- of --, therefor.

In column 14, line 20, in Claim 10, delete "including" and insert -- includes generating --, therefor.

Signed and Sealed this

Twentieth Day of July, 2010

David J. Kappos
*Director of the United States Patent and Trademark Office*